United States Patent [19]

Dear

[11] Patent Number: 5,406,252
[45] Date of Patent: Apr. 11, 1995

[54] SEAT BELT WARNING DEVICE

[75] Inventor: Timothy W. Dear, Middlesbrough, England

[73] Assignee: University of Teesside, England

[21] Appl. No.: 30,543

[22] Filed: Mar. 12, 1993

[30] Foreign Application Priority Data

Mar. 24, 1992 [GB] United Kingdom ............ 9206340
Oct. 9, 1992 [GB] United Kingdom ............ 9221241

[51] Int. Cl.⁶ .................................................. B60Q 1/00
[52] U.S. Cl. ............................. 340/457.1; 200/61.58 B
[58] Field of Search ........................... 340/457.1, 457; 180/268; 200/61.58 B

[56] References Cited

U.S. PATENT DOCUMENTS 3,462,731  8/1969  Gray ........................... 340/457.1
3,840,849 10/1974  Lohr ........................... 340/457.1

FOREIGN PATENT DOCUMENTS 3432088  2/1985  Germany.
1406864  9/1975  United Kingdom.

Primary Examiner—Jeffery A. Hofsass
Attorney, Agent, or Firm—Larson and Taylor

[57] ABSTRACT

A device primarily for indicating when a seat belt is disconnected comprises an electronic unit housed in or on the buckle of the seat belt, and including a switch the condition of which is altered on insertion and removal of the seat belt key into and from the buckle. On insertion of the key into the buckle a first signal indicative of connection of the seat belt is transmitted from the device and, on removal of the key from the buckle, a second signal indicative of disconnection of the seat belt is transmitted from the device.

10 Claims, 2 Drawing Sheets

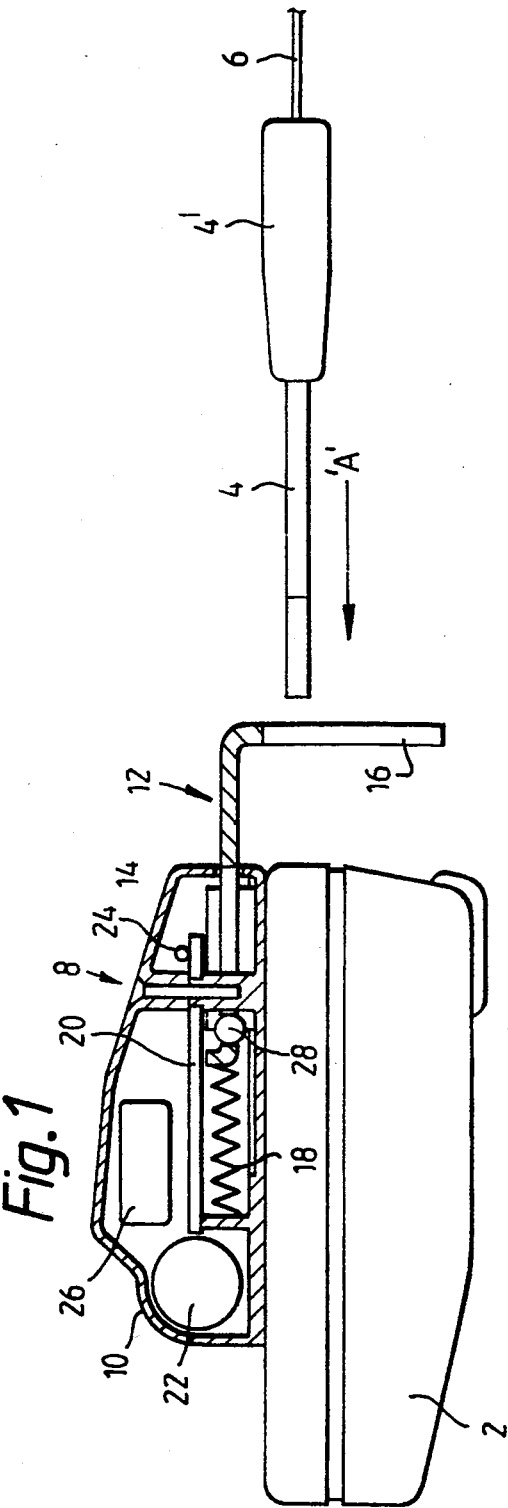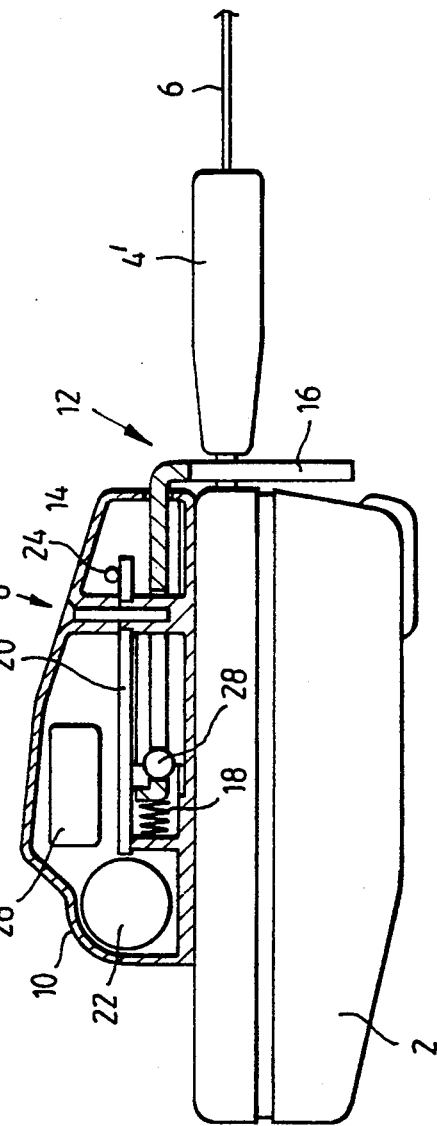

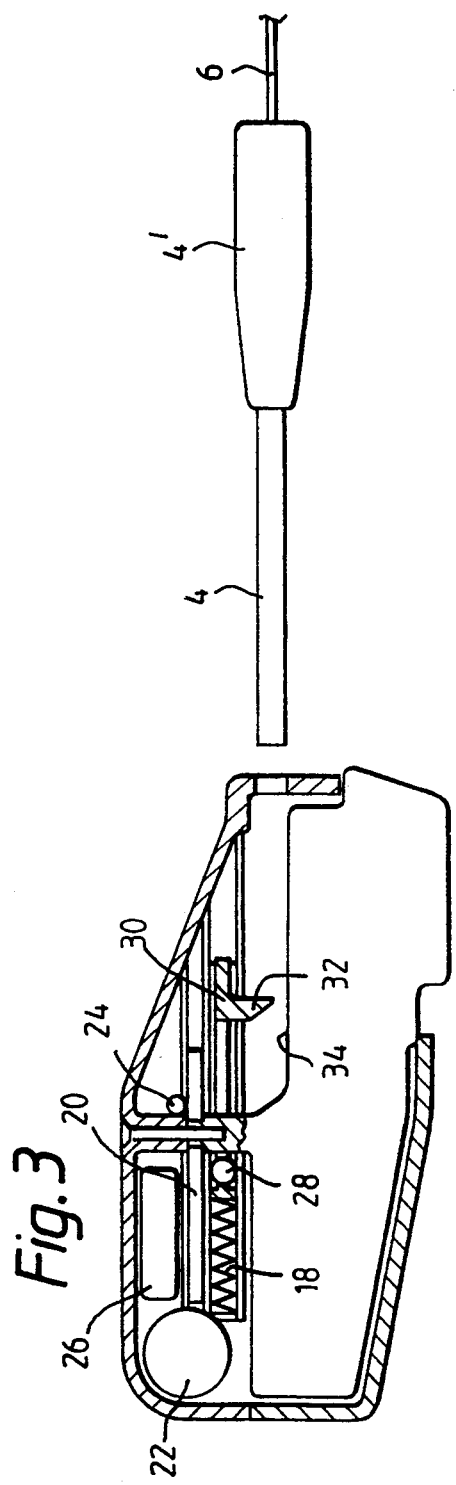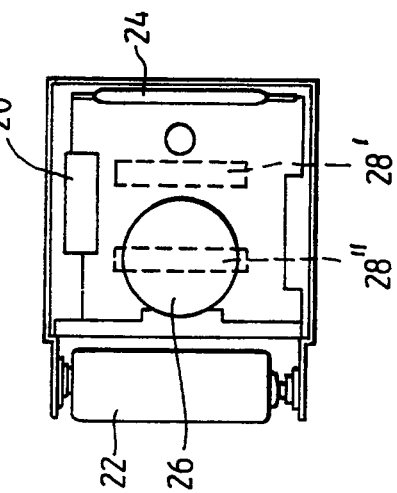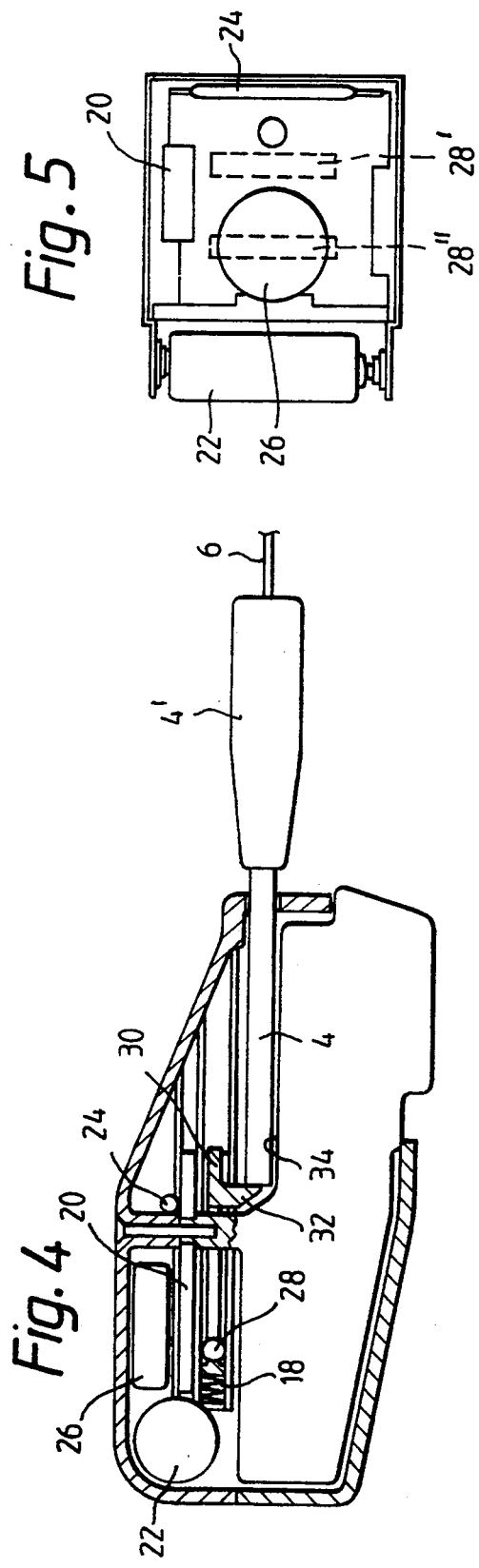

SEAT BELT WARNING DEVICE

BACKGROUND OF THE INVENTION

This invention relates to a seat belt warning device, and more particularly to such a device for providing an indication of the disconnection of a seat belt buckle and associated key.

Children and mentally-retarded persons commonly travel in the rear of motor vehicles, and a serious problem experienced by those who are acting as guardians over such passengers is that a rear seat belt or child safety-seat belt can easily be disengaged by the passenger, either intentionally or unintentionally, without the knowledge of the guardian. This not only results in the person in control of the vehicle being liable to prosecution, but, more importantly, puts the rear seat passenger in danger of serious injury in an emergency situation.

Although various indicating devices have been incorporated into seat belt buckle/key combinations, these are primarily concerned with providing a warning to a driver that he has not fastened his own seat belt prior to driving the vehicle, such devices commonly being contained within the ignition circuit of the vehicle and being powered by the vehicle electrics.

SUMMARY OF THE INVENTION

It is an object of the invention to provide a warning device for association with a seat belt buckle and capable of indicating that the buckle and key have been disconnected.

According to the present invention there is provided a seat belt warning device comprising an electronic unit housed in or on the buckle of the seat belt, said unit incorporating a switch actuation of which causes a warning signal to be transmitted by said electronic unit, the arrangement being such that, on insertion of the key of the seat belt into the buckle, the switch is actuated whereby a signal indicative of connection of the seat belt is transmitted by the electronic unit, and, on removal of the key from the buckle, the switch is actuated whereby a signal indicative of disconnection of the seat belt is transmitted by the electronic unit.

Thus it will be appreciated that, in the situation outlined above, the guardian of the child can immediately determine if, without his knowledge, his charge has disconnected his seat belt, and can take appropriate action.

Conveniently the electronic unit includes a power source therein, for example a battery, whereby actuation of the device is independent of the electrics of an associated vehicle.

In one embodiment of the invention, the electronic unit is housed within a body member adapted to be mounted on, externally of, the buckle, the body member including a sensing element slidable relative to the body member and having an inoperative position projecting from the body member, the arrangement being such that, on insertion of the key of the seat belt into the buckle, the sensing element is moved from its inoperative position projecting from the body member to an operative position in which the switch is actuated, and whereby said signal indicative of connection is transmitted, removal of the key from the buckle resulting in the sensing element returning to its inoperative position and actuating said switch whereby said signal indicative of disconnection is transmitted.

Preferably the sensing element is resiliently urged towards its inoperative position, for example by a coil spring housed within the body member and reacting between the body member and a portion of the sensing element within the body member.

In an alternative embodiment of the invention, the electronic unit is housed within the buckle, the switch being actuated by the key on insertion and removal thereof into and from the buckle.

In such an arrangement, it is preferred that a sensing element is mounted in the buckle for engagement by the key whereby, on insertion of the key into the buckle, the sensing element is moved from a normal inoperative position to a displaced, operative position in which the switch is actuated and whereby said signal indicative of connection is transmitted, removal of the key from the buckle resulting in return of the sensing element to its inoperative position and actuation of the switch whereby said signal indicative of disconnection is transmitted.

Again it is preferred that the sensing element is resiliently urged towards its inoperative position, for example by a coil spring.

In both embodiments of the invention, the electronic unit may comprise a bistable circuit incorporating a magnetically-operated reed switch, the electronic unit further comprising a magnet movable with the sensing element, the arrangement being such that, on movement of the sensing element from its inoperative position to its operative position, the magnet is moved away from the reed switch to open said switch and actuate the bistable circuit whereby the signal indicative of connection is transmitted, and, on return of the sensing element to its inoperative position, the magnet is moved towards the reed switch to close said switch and actuate the bistable circuit whereby the signal indicative of disconnection is transmitted.

Conveniently the bistable circuit includes an audible device, preferably a piezo sounder, which is actuated on opening and closing of the reed switch, the output from the circuit on opening of the switch being of short duration, for example of the order of one second, and the output from the circuit on closing of the switch being of longer duration, for example of the order of 3 seconds.

BRIEF DESCRIPTION OF THE DRAWINGS

FIGS. 1 and 2 are vertical sections through a first seat belt warning device according to the invention with the key disconnected from and connected with the buckle respectively;

FIGS. 3 and 4 are vertical section through a second seat belt warning device according to the invention with the key disconnected from and connected with the buckle respectively, and FIG. 5 shows the electronic unit associated with the embodiments of FIGS. 1 to 4.

DESCRIPTION OF THE PREFERRED EMBODIMENTS

Referring to FIGS. 1 and 2, there is shown a seat belt buckle 2 and associated buckle key 4 with attached safety belt 6, all of which operate in conventional manner on insertion and removal of the key 4 into and out of the buckle 2. The key 4 is integral with an increased-width body portion 4'.

As mentioned above the invention is particularly concerned with providing an indication when the key 4 is removed from the buckle 2, primarily in the case of seat belts securing children or retarded persons in rear seats out of immediate sight of their guardian or the driver of the vehicle.

In order to achieve this object there is provided a warning device indicated generally at 8 for attachment to the exterior of the buckle 2, for example by the use of double-sided adhesive pads or tape.

More particularly, the device 8 comprises a moulded plastics body member or housing 10 in which is mounted a sensing element or slider 12 conveniently of moulded plastic and in the form of a plate 14 the inner extent of which is contained within the housing 10 and the outer extent of which projects from the housing 10 and terminates in a pair of opposed, downwardly-extending leg portions 16 defining a slot therebetween for reasons which will become apparent.

The slider 12 is resiliently biased into the outermost, inoperative position shown in FIG. 1 by means of a coil spring 18 reacting between a fixed abutment within the housing 10 and the inner end of the plate 14.

The slider 12 is movable, on the application of an axial force in the direction of arrow 'A', from the normal inoperative position shown in FIG. 1 to the displaced operative position shown in FIG. 2 in which the leg portions 16 of the slider abut the end of the buckle 2 and the spring 18 is fully compressed.

An initial insertion of the key 4 into the buckle 2 to effect conventional fastening of the seat belt, the key 4 passes through the slot between the opposed leg portions 6 of the slider 12. The shoulders of the body portion 4' then engage the leg portions 6, whereby further insertion of the key 4 into the buckle 2 to complete locking of the seat belt moves the slider 12 from the inoperative position of FIG. 1 to the operative position of FIG. 2.

Also located within the housing 10 is a printed circuit board 20 on which is mounted a bistable circuit powered by a battery 22 and including a reed switch 24. The output from the circuit is connected to a piezo sounder 26.

The slider 12 carries a magnet 28 movable therewith, said magnet 28, in the inoperative position of the slider 12, being located adjacent the reed switch 24, and said magnet 28, in the operative position of the slider 12, being located remote from the reed switch 24, as clearly seen in FIGS. 1 and 2 respectively. In FIG. 5, the magnet is referenced 28' in the inoperative position of the slider 12 and is referenced 28" in the operative position of the slider 12.

The electronic arrangement is such that, on movement of the magnet 28 away from the switch 24—i.e. from the position shown in FIG. 1 to the position shown in FIG. 2—the switch 24 is opened to activate the bistable circuit which has a short time constant in this condition thereof. The output of the circuit changes for the duration of its time constant, enabling an oscillator to pulse an audio oscillator. Thus a short signal, typically three consecutive bleeps lasting a total of about one second, is emitted by the piezo sounder 26 to indicate that the seat belt has been connected. If the life of the battery 20 is low, the signal indicative of connection of the seat belt will not be transmitted, thus automatically indicating that the battery should be replaced.

When the seat belt is unfastened, the magnet 28 moves with the slider 12 under the bias of the spring 18 towards the switch 24 and, in the inoperative position of the slider 12 associated with disconnection of the key from the buckle 2, the magnet 28 closes the switch 24 whereby the bistable circuit is once again actuated. The time constant associated with this condition of the circuit is longer than the aforementioned time constant, typically 3 seconds, whereby a stream of bleeps is transmitted by piezo sounder 26 to give a positive audible warning that the belt has been unfastened.

Thus it will be appreciated that the driver of the vehicle, or a front seat passenger, can readily determine if and when a rear seat belt has been disconnected.

As well as being mountable on the buckle 2 of a conventional seat belt (front or rear), the device 8 can be mounted on the buckle of a baby seat in the rear of a car to be actuated by the associated key.

The described device is totally self-contained and is therefore completely independent of the vehicle electrics, and it can easily and quickly be fitted to any existing buckle 2 using adhesive pads or tape without any modification to the original fittings. Furthermore, the presence of the device does not impose any restrictions on normal seat belt usage, the device being designed to be extremely unobtrusive.

An alternative embodiment of the invention is shown in FIGS. 3 and 4 with components equivalent to those of the embodiment of FIGS. 1 and 2 being similarly referenced. The basic difference between this alternative embodiment and that of FIGS. 1 and 2 is that the former, instead of including a separate housing 10 for location on, externally of, the buckle 2, is incorporated in the buckle 2 itself.

Referring to FIGS. 3 and 4, the device comprises a slider 30 guided for longitudinal sliding movement within the buckle 2 against the bias of a coil spring 18, said slider carrying a magnet 28. The slider 30 includes a depending abutment portion 32 located in channel 34 of the buckle 2 for receiving the key 4.

On initial insertion of the key 4 into the channel 34 of the buckle 2, the end of the key engages the abutment portion 32 of the slider 30, continued movement of the key 4 into its locking position moving the slider 30 from its inoperative position shown in FIG. 3 to its operative position shown in FIG. 4.

Subsequent removal of the key 4 from the buckle 2 results in the slider 30 being biased by the spring 18 back to its inoperative position.

As in the embodiment of FIGS. 1 and 2, the magnet 28 is moved in accordance with movement of the slider 30 into and out of proximity with the switch 24 whereby the outputs of the bistable circuit and the warnings provided thereby are the same as detailed above with reference to FIGS. 1 and 2.

Various modifications may be made to the above described embodiments without departing from the scope of the basic invention. For example the switching mechanism may be other than magnetically operated, while, in the embodiment of FIGS. 3 and 4, part of the key 4 may be magnetised rather than providing a separate magnet 28. Other modifications will be apparent to those skilled in the art.

What I claim and desire to secure by Letters Patent is:

1. A warning device for a seat belt having connectable buckle and key, the device comprising an electronic unit carried by the buckle of the seat belt, and a magnetically-operated switch incorporated in said unit actuation of which causes a warning signal to be transmitted by said electronic unit, the arrangement being such that, on insertion of the key of the seat belt into the buckle, the switch is actuated whereby a signal indicative of connection of the seat belt is transmitted by the electronic unit, and, on removal of the key from the buckle, the switch is actuated whereby a signal indicative of disconnection of the seat belt is transmitted by the electronic unit, said electronic unit comprising a bistable circuit incorporating said magnetically-operated switch, and a magnet movable with a sensing element, the arrangement being such that, on movement of the sensing element from an inoperative position to an operative position, the magnet is moved away from the switch to open said switch and actuate the bistable circuit whereby the signal indicative of connection is transmitted, and, on return of the sensing element to its inoperative position, the magnet is moved towards the switch to close said switch and actuate the bistable circuit whereby the signal indicative of disconnection is transmitted, said bistable circuit further including an audible device which is actuated on opening and closing of the switch, the output from the circuit on opening of the switch being of short duration, and the output from the circuit on closing of the switch being of longer duration.

2. A warning device as claimed in claim 1 and including a power source included in the electronic unit.

3. A warning device according to claim 2 wherein said power source comprises a batter.

4. A warning device as claimed in claim 1 and comprising a body member in which the electronic unit is housed, said body member being adapted to be mounted on, externally of, the buckle, and a sensing element mounted in the body member to be slidable relative to the body member, said sensing member having an inoperative position projecting from the body member, the arrangement being such that, on insertion of the key of the seat belt into the buckle, the sensing element is moved from its inoperative position projecting from the body member to an operative position in which the switch is actuated and whereby said signal indicative of connection is transmitted, removal of the key from the buckle resulting in the sensing element returning to its inoperative position and actuating said switch whereby said signal indicative of disconnection is transmitted.

5. A warning device as claimed in claim 4 and including resilient means urging the sensing element towards its inoperative position.

6. A warning device as claimed in claim 5 in which the resilient means comprise a coil spring housed within the body member, the sensing element including a portion within the body member, the coil spring reacting between the body member and said portion of the sensing element within the body member.

7. A warning device as claimed in claim 1 in which the electronic unit is housed within the buckle, the switch being actuated by the key on insertion and removal thereof from the buckle.

8. A warning device as claimed in claim 7 and including a sensing element mounted in the buckle for engagement by the key whereby, on insertion of the key into the buckle, the sensing element is moved from a normal inoperative position to a displaced operative position in which the switch is actuated and whereby said signal indicative of connection is transmitted, removal of the key from the buckle resulting in return of the sensing element to its inoperative position and actuation of the switch whereby said signal indicative of disconnection is transmitted.

9. A warning device as claimed in claim 8 and including resilient means urging the sensing element towards its inoperative position.

10. A warning device according to claim 1 wherein said magnetically-operated switch comprises a reed switch.

* * * * *